Patented Jan. 29, 1924.

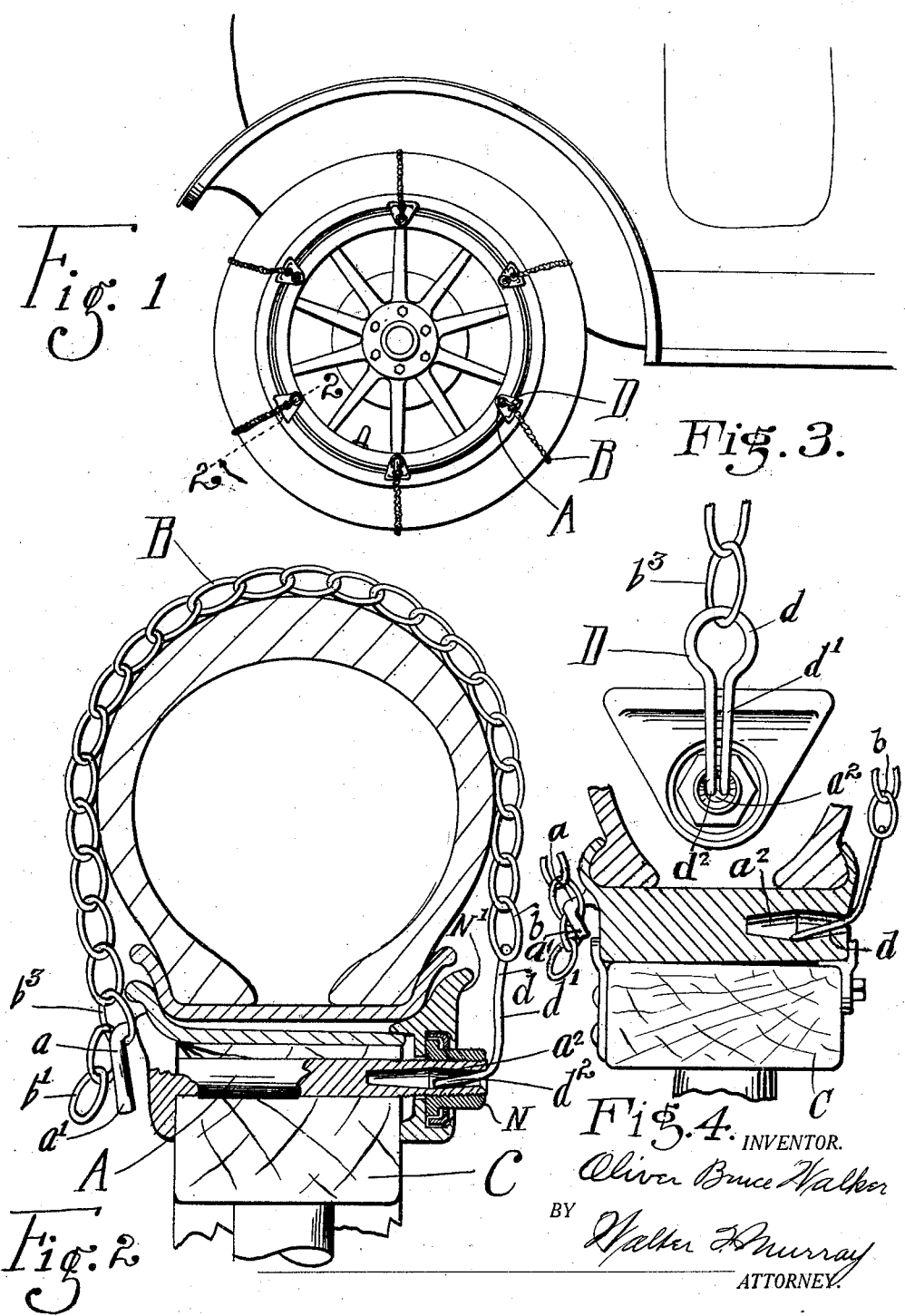

1,482,055

UNITED STATES PATENT OFFICE.

OLIVER BRUCE WALKER, OF CINCINNATI, OHIO.

ANTISKID CHAIN.

Application filed January 7, 1921. Serial No. 435,582.

*To all whom it may concern:*

Be it known that I, OLIVER BRUCE WALKER, a citizen of the United States of America, and resident of Cincinnati, in the county of Hamilton and State of Ohio, have invented new and useful Improvements in Antiskid Chains, of which the following is a specification.

An object of my invention is to provide anti-skid chains for automobiles, that can be applied without jacking up of the wheels and without revolving the wheels.

Another object is to provide such chains that are simple in construction and application.

Another object is to provide chains that can be readily applied to any make or size of tire, but that are especially adapted for use with wheels having demountable rims.

These and other objects are attained by the means described herein and disclosed in the accompanying drawing in which:—

Fig. 1 is a fragmental view of an automobile having mounted on a wheel thereof, a device embodying my invention.

Fig. 2 is an enlarged sectional view on line 2—2 of Fig. 1.

Fig. 3 is an end view of a part of the device shown in Fig. 2.

Fig. 4 is a view similar to Fig. 2 showing a modification.

My invention comprises a cross bolt or mounting bolt A extending thru the felly C of an automobile wheel, such bolt being of the type that is ordinarily used in attaching demountable rim, except that on the inside end of the bolt A the hook $a$ is formed, the end $a'$ of the hook extending toward the axis of the wheel. An axial bore $a^2$ is formed in the other or outer end of the bolt A. Any suitable means may be used for securing the bolt upon the felly, for example a nut N and a dog N′ upon which the nut bears, all of which is common and well known in the art. The chain B is adapted to engage the hook $a$ in either its first link $b'$ or one of the inner links adjacent thereto and to extend over the tire and has mounted upon its last and outer link, a spring member or clip D. The clip D has an eye $d$ thru which the end link $b$ of the chain passes. The arms $d'$ extend from the eye substantially in parallelism. The fingers $d^2$ extend from the arms at an angle thereto. This angle is substantially a right angle. The material from which the clip D is made is preferably of a diameter or thickness substantially equal to the radius of the axial bore in the bolt A.

The chains are applied in the following manner.

The bolt A is mounted upon the automobile wheel and replaces the bolt ordinarily used on such wheels to secure the rim upon the wheel.

I will assume that the chain to be applied will have sufficient play if its third link $b^3$ engage the hook $a$, and the outer end of the chain will then be secured to the wheel. The third link $b^3$ is passed over the end $a'$ of the hook $a$. The chain is then passed over the tire and the fingers $d^2$ are inserted in the axial bore $a^2$ in the bolt. By making the clip fingers substantially equal in thickness to the radius of the axial bore a snug fit is assured. When the wheel is revolved, the pull on the chain is directed upon the fingers at an angle to their length and binds the clip fingers upon the walls of the bore with a force that varies in proportion to the pull on the chain, the greater the pull, the greater the binding force of the clip fingers upon the walls of the bore $a^2$. The clip is readily removed from the axial bore by pulling on the clip in the direction of its length. The bore may be tapered but is not necessarily so constructed.

In clincher type and other tire constructions, a suitable corresponding hook can be mounted upon the inner side of the wheel in any desirable and suitable manner, as shown in Fig. 4, in which the hook $a$ is formed on the rim. Also, the equivalent of the axial bore in the bolt may be provided by forming a slot in the clincher rim itself, as shown in this Fig. 4.

What I claim is:—

1. The combination of an automobile wheel-structure having a bore in one side, a hook having an open throat mounted on the opposite side of the wheel, an anti-skid chain having links, any one of which adjacent to one end is adapted to be mounted on the hook, and a spring clip mounted on the other end of the chain and adapted to engage in the bore in the wheel-structure.

2. The combination with an anti-skid chain of an automobile wheel-structure having a bore in one side, means mounted on the opposite side of the wheel-structure adapted to engage one end of a chain, and a spring clip mounted on the other end of the chain and comprising arms and fingers extending from the arms at an angle thereto and adapted to be inserted in the bore by a nonrotating movement of the fingers, the fingers being adapted to clamp on the walls of the bore and thereby retain the chain on the wheel.

3. In combination with an anti-skid chain for automobiles, a bolt adapted to extend transversely thru the felly of a wheel and having an axial bore at one end, a hook mounted on the other end of the bolt, the chain being adapted to be mounted at one end thereof on the hook and to extend about the outer face of the tire, and a spring clip mounted on the other end of the chain adapted to engage in the axial bore in the bolt.

4. In combination with an anti-skid chain for automobiles, a bolt adapted to extend transversely thru the felly of a wheel and having an axial bore at one end, a hook mounted on the other end of the bolt, the chain being adapted to be mounted adjacent its one end on the hook and to extend about the outer face of the tire, and a spring clip mounted on the other end of the chain, and comprising arms, and fingers extending from the arms at an angle thereto and adapted to engage in the axial bore in the bolt.

5. In combination with a wheel-structure having a pneumatic tire, a chain-engaging member at one side of the wheel-structure, a chain adapted to have one end engaged therewith and having at its other end a spring-clip, a bore being provided at the other side of the wheel-structure and arranged transversely with respect to the rim of the wheel and opening away from the wheel and adapted to receive said spring-clip.

6. The combination with a bolt having an axial bore at one end and means at the other end adapted to secure one end of an anti-skid chain; of an anti-skid chain, and a clip mounted on one end of the chain comprising arms and fingers of a diameter such that they may enter the bore in the bolt, the fingers extending from the arms at an angle such that when the fingers are inserted in the bore, a radial strain upon the arms clamps the ends of the fingers upon opposite walls of the bore in the bolt, whereby the fingers are precluded from separation from the bolt.

7. The combination with a wheel carrying on one side means adapted to secure one end of an anti-skid chain and having a bore extending in substantial parallelism with its axle and opening on the opposite side of the wheel, of an anti-skid chain adapted to be secured upon the first mentioned means, and a clip mounted on the chain, comprising arms, and fingers of a diameter such that they may enter the bore in the wheel, the fingers extending from the arms at an angle such that when the fingers are inserted in the bore, a radial strain upon the arms clamps the ends of the fingers upon opposite walls of the bore in the wheel, whereby the clip is precluded from separation from the wheel.

In testimony whereof, I have hereunto subscribed my name this 31st day of December, 1920.

OLIVER BRUCE WALKER.